US010951614B2

(12) United States Patent
Liu

(10) Patent No.: US 10,951,614 B2
(45) Date of Patent: Mar. 16, 2021

(54) METHOD AND SYSTEM FOR NETWORK SECURITY

(71) Applicant: Alibaba Group Holding Limited, Grand Cayman (KY)

(72) Inventor: Jincheng Liu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 421 days.

(21) Appl. No.: 15/886,582

(22) Filed: Feb. 1, 2018

(65) Prior Publication Data
US 2018/0288044 A1 Oct. 4, 2018

(30) Foreign Application Priority Data
Mar. 30, 2017 (CN) .......................... 201710202450.2

(51) Int. Cl.
*G06F 21/00* (2013.01)
*H04L 29/06* (2006.01)
(Continued)

(52) U.S. Cl.
CPC ............ *H04L 63/0876* (2013.01); *H04L 9/32* (2013.01); *H04L 9/3228* (2013.01);
(Continued)

(58) Field of Classification Search
CPC ............... H04L 63/0876; H04L 9/3228; H04L 63/0853; H04L 9/32; H04L 63/12;
(Continued)

(56) References Cited

U.S. PATENT DOCUMENTS 5,307,410 A 4/1994 Bennett
5,675,648 A 10/1997 Townsend
(Continued)

FOREIGN PATENT DOCUMENTS

CN 101222488 7/2008
CN 101741852 6/2010
(Continued)

OTHER PUBLICATIONS

Mark Hillery et al. "Quantum Secret Sharing", American Physical Society 1999.
(Continued)

*Primary Examiner* — Lisa C Lewis
(74) *Attorney, Agent, or Firm* — Shun Yao; Park, Vaughan, Fleming & Dowler LLP

(57) ABSTRACT

One embodiment provides a method for facilitating network security, the method comprising: receiving, by a server from an application associated with a user, a first data packet which includes a first set of verification information and a first command; and in response to determining that the first set of verification information does not satisfy a first predetermined condition: generating a verification code destined for a first computing device associated with the user; in response to not successfully authenticating the verification code, discarding the first data packet; and in response to successfully authenticating the verification code, transmitting the first command to an end device, which causes the end device to execute the first command.

20 Claims, 10 Drawing Sheets

(51) Int. Cl.
  *H04L 9/32* (2006.01)
  *H04W 12/08* (2021.01)
  *H04W 12/06* (2021.01)
  *H04W 12/00* (2021.01)

(52) U.S. Cl.
  CPC .......... *H04L 63/0853* (2013.01); *H04L 63/12* (2013.01); *H04L 63/20* (2013.01); *H04W 12/06* (2013.01); *H04W 12/08* (2013.01); *H04W 12/00502* (2019.01); *H04W 12/00503* (2019.01)

(58) Field of Classification Search
  CPC ......... H04L 63/20; H04L 63/08; H04L 63/14; H04L 63/1433; H04L 63/1441; H04W 12/08; H04W 12/06; H04W 12/00503; H04W 12/00502
  See application file for complete search history.

(56) References Cited

U.S. PATENT DOCUMENTS

| | | | |
|---|---|---|---|
| 6,505,247 B1 | 1/2003 | Steger | |
| 8,266,433 B1 | 9/2012 | Przykucki | |
| 8,701,199 B1* | 4/2014 | Dotan | H04L 63/08 726/25 |
| 8,990,550 B1 | 3/2015 | Hushon | |
| 9,077,577 B1 | 7/2015 | Ashrafi | |
| 9,130,742 B2 | 9/2015 | Yao | |
| 9,294,267 B2 | 3/2016 | Kamath | |
| 9,323,901 B1 | 4/2016 | Nair | |
| 9,698,979 B2 | 7/2017 | Armstrong | |
| 9,830,467 B1 | 11/2017 | Harold | |
| 9,887,976 B2 | 2/2018 | Hughes | |
| 2001/0023416 A1 | 9/2001 | Hosokawa | |
| 2005/0039125 A1* | 2/2005 | Katano | H04N 1/0035 715/700 |
| 2005/0044225 A1* | 2/2005 | Ota | H04L 29/06 709/225 |
| 2005/0071632 A1 | 3/2005 | Pauker | |
| 2005/0071677 A1 | 3/2005 | Khanna | |
| 2005/0135620 A1 | 6/2005 | Kastella | |
| 2005/0144440 A1 | 6/2005 | Catherman | |
| 2005/0144484 A1 | 6/2005 | Wakayama | |
| 2005/0259825 A1 | 11/2005 | Trifonov | |
| 2006/0026693 A1 | 2/2006 | Bade | |
| 2006/0056630 A1 | 3/2006 | Zimmer | |
| 2007/0016794 A1 | 1/2007 | Harrison | |
| 2007/0076889 A1 | 4/2007 | DeRobertis | |
| 2007/0147292 A1 | 6/2007 | Van Ewijk | |
| 2007/0192598 A1 | 8/2007 | Troxel | |
| 2008/0065881 A1 | 3/2008 | Dawson | |
| 2008/0114983 A1 | 5/2008 | Sherkin | |
| 2008/0123859 A1 | 5/2008 | Mamidwar | |
| 2008/0165973 A1 | 7/2008 | Miranda Gavillan | |
| 2008/0219449 A1 | 9/2008 | Ball | |
| 2008/0222734 A1 | 9/2008 | Redlich | |
| 2009/0019285 A1 | 1/2009 | Chen | |
| 2009/0034733 A1 | 2/2009 | Raman | |
| 2009/0055892 A1 | 2/2009 | Lu | |
| 2009/0092252 A1 | 4/2009 | Noll | |
| 2009/0106551 A1 | 4/2009 | Boren | |
| 2009/0125444 A1 | 5/2009 | Cochran | |
| 2009/0204812 A1 | 8/2009 | Baker | |
| 2009/0262942 A1 | 10/2009 | Maeda | |
| 2009/0271634 A1 | 10/2009 | Boult | |
| 2010/0132015 A1* | 5/2010 | Lee | G06F 21/57 726/3 |
| 2010/0169953 A1 | 7/2010 | Hofer | |
| 2010/0199336 A1 | 8/2010 | Tan | |
| 2010/0211787 A1 | 8/2010 | Bukshpun | |
| 2010/0265077 A1 | 10/2010 | Humble | |
| 2010/0277435 A1* | 11/2010 | Han | H04B 5/0031 345/174 |
| 2010/0299526 A1 | 11/2010 | Wiseman | |
| 2011/0069972 A1 | 3/2011 | Wiseman | |
| 2011/0099367 A1 | 4/2011 | Thom | |
| 2011/0126011 A1 | 5/2011 | Choi | |
| 2011/0167503 A1 | 7/2011 | Horal | |
| 2011/0209202 A1 | 8/2011 | Otranen | |
| 2011/0213979 A1 | 9/2011 | Wiseman | |
| 2011/0231615 A1 | 9/2011 | Ober | |
| 2012/0045002 A1 | 2/2012 | Zivkovic | |
| 2012/0084570 A1 | 4/2012 | Kuzin | |
| 2012/0087500 A1 | 4/2012 | Ukita | |
| 2012/0150444 A1* | 6/2012 | Hong | G01C 21/3461 701/533 |
| 2012/0166993 A1 | 6/2012 | Anderson | |
| 2012/0177201 A1 | 7/2012 | Ayling | |
| 2012/0210408 A1 | 8/2012 | Lu | |
| 2012/0250863 A1 | 10/2012 | Bukshpun | |
| 2012/0265892 A1 | 10/2012 | Ma | |
| 2013/0083926 A1 | 4/2013 | Hughes | |
| 2013/0101119 A1 | 4/2013 | Nordholt | |
| 2013/0208894 A1 | 8/2013 | Bovino | |
| 2013/0219454 A1* | 8/2013 | Hewinson | G06F 16/29 726/1 |
| 2013/0227286 A1 | 8/2013 | Brisson | |
| 2013/0246641 A1 | 9/2013 | Vimpari | |
| 2013/0251145 A1 | 9/2013 | Lowans | |
| 2013/0259233 A1 | 10/2013 | Baba | |
| 2013/0308506 A1 | 11/2013 | Kim | |
| 2013/0315395 A1 | 11/2013 | Jacobs | |
| 2014/0068765 A1 | 3/2014 | Choi | |
| 2014/0104137 A1 | 4/2014 | Brown | |
| 2014/0141725 A1 | 5/2014 | Jesme | |
| 2014/0143149 A1* | 5/2014 | Aissi | G06F 21/629 705/44 |
| 2014/0173713 A1* | 6/2014 | Zheng | G06F 3/0488 726/16 |
| 2014/0237565 A1 | 8/2014 | Fleysher | |
| 2014/0259138 A1 | 9/2014 | Fu | |
| 2014/0281511 A1 | 9/2014 | Kaushik | |
| 2014/0331050 A1 | 11/2014 | Armstrong | |
| 2014/0351915 A1 | 11/2014 | Otranen | |
| 2015/0046709 A1 | 2/2015 | Anspach | |
| 2015/0062904 A1 | 3/2015 | Sanga | |
| 2015/0089624 A1* | 3/2015 | Kim | H04L 12/12 726/9 |
| 2015/0095987 A1 | 4/2015 | Potash | |
| 2015/0096004 A1* | 4/2015 | Zhou | H04L 9/3231 726/7 |
| 2015/0134727 A1* | 5/2015 | Lee | H04L 12/2818 709/203 |
| 2015/0134947 A1 | 5/2015 | Varcoe | |
| 2015/0181308 A1 | 6/2015 | Ducharme | |
| 2015/0207926 A1 | 7/2015 | Brown | |
| 2015/0222619 A1 | 8/2015 | Hughes | |
| 2015/0236852 A1 | 8/2015 | Tanizawa | |
| 2015/0270963 A1 | 9/2015 | Tanizawa | |
| 2015/0271147 A1 | 9/2015 | Tanizawa | |
| 2015/0288517 A1 | 10/2015 | Evans | |
| 2015/0288542 A1 | 10/2015 | Ashrafi | |
| 2015/0309924 A1 | 10/2015 | Chen | |
| 2015/0317469 A1 | 11/2015 | Liu | |
| 2015/0325242 A1 | 11/2015 | Lu | |
| 2015/0326613 A1 | 11/2015 | Devarajan | |
| 2015/0350181 A1 | 12/2015 | Call | |
| 2015/0379261 A1 | 12/2015 | Daigle | |
| 2015/0381363 A1 | 12/2015 | Teixeira | |
| 2016/0013937 A1 | 1/2016 | Choi | |
| 2016/0021068 A1 | 1/2016 | Jueneman | |
| 2016/0080708 A1 | 3/2016 | Urata | |
| 2016/0087946 A1 | 3/2016 | Yang | |
| 2016/0105439 A1 | 4/2016 | Hunt | |
| 2016/0127127 A1 | 5/2016 | Zhao | |
| 2016/0149700 A1 | 5/2016 | Fu | |
| 2016/0210105 A1 | 7/2016 | Ru | |
| 2016/0226846 A1 | 8/2016 | Fu | |
| 2016/0241396 A1 | 8/2016 | Fu | |
| 2016/0248581 A1 | 8/2016 | Fu | |
| 2016/0294783 A1 | 10/2016 | Piqueras Jover | |
| 2016/0320849 A1* | 11/2016 | Koo | G06F 3/0488 |
| 2016/0337329 A1 | 11/2016 | Sood | |

(56) References Cited

U.S. PATENT DOCUMENTS

| | | | |
|---|---|---|---|
| 2016/0359839 A1 | 12/2016 | Natividad | |
| 2016/0366713 A1 | 12/2016 | Sonnino | |
| 2017/0034167 A1 | 2/2017 | Figueira | |
| 2017/0104588 A1 | 4/2017 | Camenisch | |
| 2017/0230173 A1 | 8/2017 | Choi | |
| 2017/0242557 A1* | 8/2017 | Rotschield | H04L 41/22 |
| 2017/0302448 A1 | 10/2017 | Luk | |
| 2017/0324730 A1 | 11/2017 | Otranen | |
| 2018/0048466 A1 | 2/2018 | Chen | |
| 2018/0063709 A1 | 3/2018 | Morrison | |
| 2018/0077449 A1 | 3/2018 | Herz | |
| 2018/0097796 A1* | 4/2018 | Thompson | H04L 63/0876 |
| 2018/0262907 A1* | 9/2018 | Alanis | H04W 12/0608 |
| 2018/0351734 A1 | 12/2018 | Zhao | |
| 2019/0021123 A1* | 1/2019 | Ma | H04B 7/155 |

FOREIGN PATENT DOCUMENTS

| | | |
|---|---|---|
| CN | 102946313 | 2/2013 |
| CN | 104579694 | 4/2015 |
| EP | 0962070 | 12/1999 |
| EP | 3007478 | 4/2016 |
| WO | 2012098543 | 7/2012 |
| WO | 2013026086 | 2/2013 |
| WO | 2016070141 | 5/2016 |

OTHER PUBLICATIONS

J G Rarity et al. "Ground to satellite secure key exchange using quantum cryptography", New Journal of Physics 2002.

Richard J Hughes et al. "Practical free-space quantum key distribution over 10 km in daylight and at night", New Journal of Physics 2002.

Baker et al. "Recommendation for Key Management—Part 1: General (Revision 3)", NIST Special Publication 800-57, Jul. 2012 (Year:2012).

Sufyan T. Faraj, "A Novel Extension of SSL/TLS Based on Quantum Key Distribution", Computer and Communication Engineering, 2008. ICCCE 2008. International Conference on, IEEE, Piscataway, NJ, USA, May 16, 2008, pp. 919-922.

Tien-Sheng Lin, et al., Quantulm Aulthentication and Secure Communication Protocols, 2006 IEEE (Year:2006).

Charles H. Bennett et al., Quantum cryptography: Public key distribution and coin tossing, www. elsevier.com/locate/tcx, 2014 (Year: 2014).

R. Alleaume et al., Using Quantum key distribution for cryptographic purposes: A survey, www.elsevier.com/locate/tcs, 2009 (Year:2009).

Toung-Shang Wei et al., Comment on "Quantum Key Distribution and Quantum Authentication Based on Entangled State", Springer, 2011 (Year: 2011).

Ivan Damgard et al., Secure Identification and QKD in the bounded-quantum-storage model, www.elsevier.com/locate/tcs, 2009 (Year: 2009).

Valerio Scarani et al., The black paper of quantum cryptography: Real implementation problems, www.elsevier.com/locate/tcs, 2014.

Jung-Lun Hsu et al., Dynamic quantum secret sharing, Springer, 2012.

Ci-Hong Liao et al., Dynamic quantum secret sharing protocol based on GHZ state, Springer, 2014.

Xugang Ren et al., A Novel Dynamic User Authentication Scheme, 2012 International Symposium on Communications and Information Technologies, 2012.

Phyllis A. Schneck et al., Dynamic Authentication for High-Performance Networked Applications, 1998 IEEE.

Lanjun Dang, An Improved Mutual Authentication Scheme for Smart Card Secure Messaging, Proceedings of the IEEE International Conference on E-Commerce Technology for Dynamic E-Business (CEC-East'04), 2004.

Wenjie Liu, et al., Authenticated Quantum Secure Direct Communication with Qutrits, Fourth International Conference on Natural Computation, IEEE 2008.

* cited by examiner

METHOD AND SYSTEM FOR NETWORK SECURITY

RELATED APPLICATION

Under 35 U.S.C. 119, this application claims the benefit and right of priority of Chinese Patent Application No. 201710202450.2, filed 30 Mar. 2017.

BACKGROUND

Field

This disclosure is generally related to network security. More specifically, this disclosure is related to a method and system for identifying unauthorized access to communications between a controlling user application/device and a controlled end device, such as an Internet of Things (IoT) device.

Related Art

The progress of technology includes the communication of increasing amounts of data. The security of the communications can be protected by traditional technologies such as firewalls (which monitor and control incoming and outgoing network traffic based on predetermined security rules) and intrusion detection systems (which monitor a network for malicious activity or policy violations). These traditional technologies can be based on detecting conditions which are known or have been previously identified as vulnerabilities in the system.

In contrast, in the rapidly growing field of IoT devices, identifying these detectable conditions and providing network security for these devices can be challenging. IoT devices are devices which have sensing or actuation capabilities, and are connected to each other via the Internet, such as wearable fitness watches, smart home appliances, factory control devices, medical devices, and vehicles. As the number of IoT devices continues to increase, a malicious attack can take over control of a device and cause the device to operate in dangerous and insecure ways. Furthermore, such an attack may be difficult to detect because the various types of IoT devices and platforms on which they run can result in unknown vulnerabilities in network security.

SUMMARY

One embodiment provides a method for facilitating network security, the method comprising: receiving, by a server from an application associated with a user, a first data packet which includes a first set of verification information and a first command; and in response to determining that the first set of verification information does not satisfy a first predetermined condition: generating a verification code destined for a first computing device associated with the user; in response to not successfully authenticating the verification code, discarding the first data packet; and in response to successfully authenticating the verification code, transmitting the first command to an end device, which causes the end device to execute the first command.

In some embodiments of the method, the first set of verification information includes one or more of network configuration information and application information. The network configuration information includes one or more of: an IP address of a network accessed by a second computing device on which the application is running; a wireless local area network name of the network accessed by the second computing device; and a system time of a first access to the network by the second computing device. The application information includes one or more of: information related to an operating system on which the application runs; a version of the application; sizes of controls in an interface for the application; and position coordinates for the controls in the interface for the application.

In some embodiments, the method further comprises: receiving, by the server from the second computing device, registration information which includes the network configuration information and the application information; and storing, by the server, the registration information.

In some embodiments of the method, determining that the first set of verification information satisfies the first predetermined condition comprises: determining that the network configuration information included in the first set of verification information matches network configuration information previously registered with the server; and determining that the application information included in the first set of verification information matches application information previously registered with the server.

In some embodiments of the method, determining that the application information included in the first set of verification information matches the application information previously registered with the server comprises: determining whether the position coordinates included in the first set of verification information fall within a region of a touch button or control previously registered with the server as corresponding to the first command.

In some embodiments, the method further comprises, in response to determining that the first set of verification information satisfies the first predetermined condition, transmitting the first command to the end device.

In some embodiments of the method, the first computing device is one or more of: a mobile telephone; and a personal computing device. The verification code is destined for one or more of: a phone number corresponding to the mobile telephone; and an email account or a network-accessible account of the user.

In some embodiments, the method further comprises: receiving, by the server from the end device, a second data packet which includes a second set of verification information, which includes information obtained by the end device from a third data packet received by the end device; obtaining a verification result by determining whether the second set of verification information satisfies a second predetermined condition; and controlling the end device by transmitting a second command based on the verification result, which causes the end device to execute the second command.

In some embodiments of the method, in response to determining that the second set of verification information does not satisfy the second predetermined condition, the transmitted second command instructs the end device to discard the third data packet. In response to determining that the second set of verification information satisfies the second predetermined condition, the transmitted second command instructs the end device to process the third data packet.

In some embodiments of the method, the second set of verification information includes a first Internet Protocol (IP) address obtained by the end device from the third data packet. Determining that the second set of verification information satisfies the second predetermined condition comprises: determining, based on the first IP address, a network type for transmitting the third data packet; and verifying the first IP address based on the network type.

Another embodiment provides a computer system for facilitating network security, the computer system comprising: a processor; and a memory coupled to the processor and storing instructions, which when executed by the processor cause the processor to perform the above-described method, wherein the computer system is the server in the above-described method.

BRIEF DESCRIPTION OF THE FIGURES

In the figures, like reference numerals refer to the same figure elements.

DETAILED DESCRIPTION

Figure 1A:
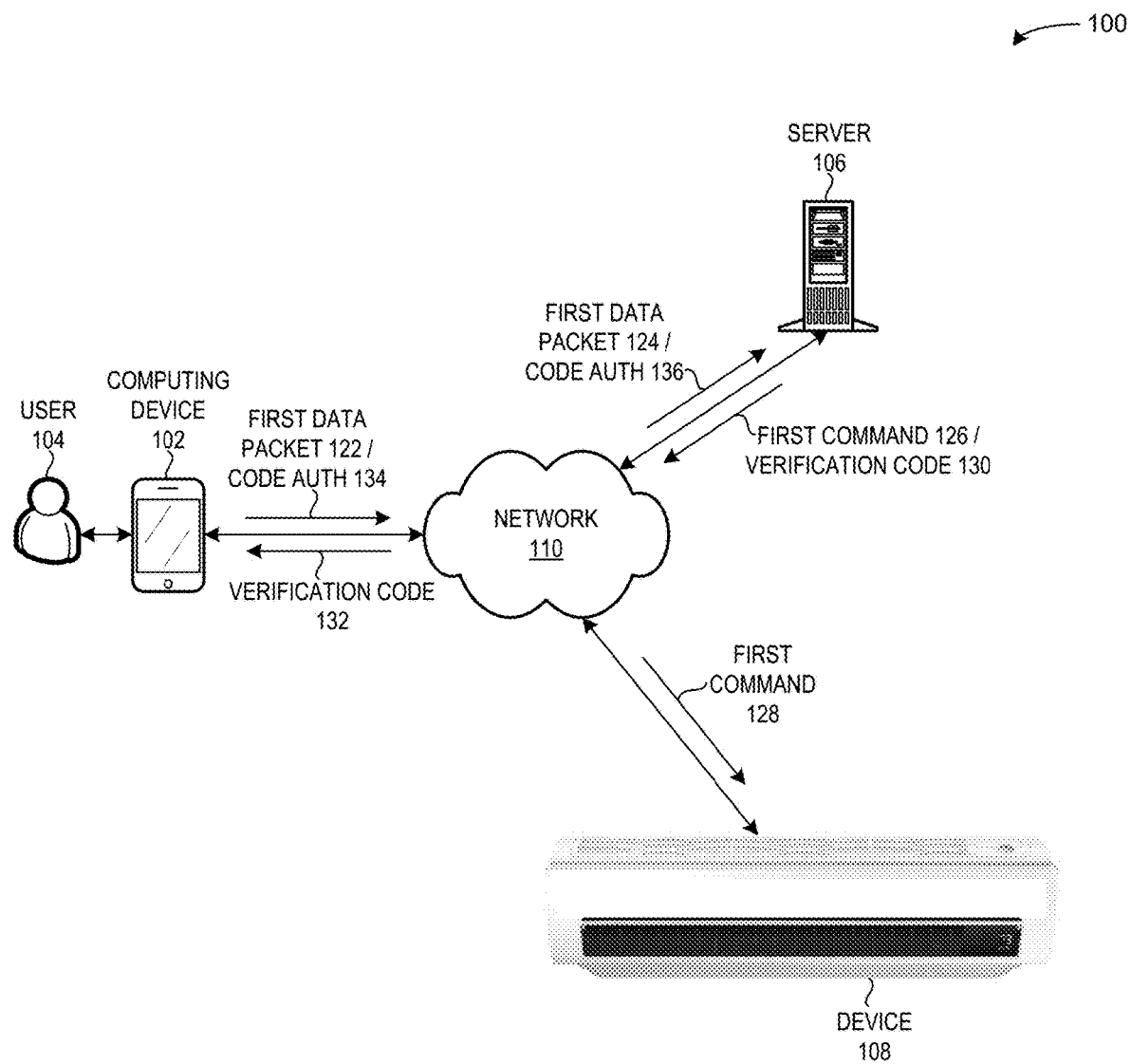
FIG. 1A illustrates an exemplary environment and communication that facilitate network security, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein provide a system which solves the problem of increasing network security by identifying data packets sent from an entity attempting to improperly control an end device. For example, the system can identify a malicious attack by an unauthorized entity attempting to send a command to turn on/off a smart device such as a wirelessly controllable home air conditioner.

Traditional network security can include technologies such as firewalls and intrusion detection systems (IDSs), which are based on detecting known conditions or previously identified vulnerabilities in a system. In contrast, identifying such conditions in the rapidly growing field of the Internet of Things (IoT) can be challenging. IoT devices are devices which have sensing or actuation capabilities, and are connected to each other via the Internet, such as wearable fitness watches, smart home appliances, factory control devices, medical devices, and vehicles. As the number of IoT devices continues to increase, a malicious attack can take over control of a device and cause the device to operate in dangerous and insecure ways. Furthermore, such an attack may be difficult to detect because the various types of IoT devices and platforms on which they run can result in unknown vulnerabilities in network security.

The embodiments described herein solve this problem by providing a system in which a user can send a command which controls an end device to a server, which allows the server to verify certain information and, if successfully verified, send the command onward to the end device for execution. For example, a user of an application can use an application on his mobile device to turn on a smart lamp (assuming that the smart lamp is currently turned off). The system can send a first data packet to a server, where the first data packet can include first verification information and a first command. The server can determine whether the first verification information satisfies a predetermined condition, such as whether position coordinates included in the verification information match previously registered position coordinates corresponding to the command. If the condition is satisfied, the server can send the first command to the smart lamp, which causes the smart lamp to turn on. If the condition is not satisfied, the server can send a verification code to the user. In one embodiment, if the user sends the first command from an application on a device different than an initially registered device, the system may determine that the condition is not satisfied and send the verification code to a phone number associated with the user. If the user responds with the correct code authentication, the server can send the command to the smart lamp, which causes the smart lamp to turn on. If the user responds with an incorrect code authentication, the server refrains from sending the command to the smart lamp, which causes the smart lamp to stay off.

In another embodiment, the end device can receive a command (e.g., in a third data packet from an unknown entity), and determine whether it should execute the command. For example, the end device can send a second data packet to the server, where the second data packet includes second verification information. The server can determine whether the second verification information satisfies a predetermined condition, such as whether an IP address carried in the second data packet (and obtained from the third data packet) matches a previously registered IP address corresponding to the command or a user or an application associated with the command. If the condition is satisfied, the server can send a second command to the end device instructing the end device to execute a command in the third data packet. If the condition is not satisfied, the server can send a second command to the end device instructing the end device to refrain from executing the command in the third data packet.

Thus, the embodiments described herein provide a system which addresses the network security issues related to protecting communications between a user who wishes to remotely control an end device (e.g., an IoT device), and also communications received by an end device from an entity wishing to remotely control the end device.

Furthermore, the embodiments described herein provide improvements to the protection of network security, where the improvements are fundamentally technological. Embodiments of the present invention provide a technological solution (e.g., providing verification for communications between an application user and an end device, and for communications received by an end device from an entity by contacting a server which provides verification functionality) to the technological problem of the security of network communications, including in a network with IoT devices.

Exemplary Network in the Prior Art

FIG. 1A illustrates an exemplary environment 100 and communication that facilitates network security, in accordance with an embodiment of the present application. Environment 100 can include a user 104 associated with a computing device 102, a server 106, and a device 108, which can communicate with each other via a network 110. Computing device 102 can be a tablet, a mobile phone, an electronic reader, a laptop computer, a desktop computer, or any other computing device. Server 106 can be any computing device which can perform the functionality described herein. Device 108 can be an end device such as an Internet of Things (IoT) device, e.g., a wearable fitness watch, a smart home appliance, a factory control device, a medical device, and a vehicle. In FIG. 1A, device 108 is depicted as a smart heating, ventilation, and air condition (HVAC) unit.

During operation, user 104 can send, via computing device 102 to server 106, a first data packet 122/124, which includes first verification information and a first command. Upon receiving first data packet 124, server 106 can determine whether the first verification information included in first data packet 124 satisfies a predetermined condition. The first verification information can include network configuration information and application information. Exemplary network configuration information can include: an IP address of a network accessed by the computing device; a wireless local area network name (such as a service set identifier (SSID)) of the network accessed by the computing device; and a system time of a first access to the network. Exemplary application information can include: information related to an operating system on which the application runs; a version of the application; sizes of controls in an interface for the application; and position coordinates for the controls in the interface for the application. Server 106 may also store network configuration information and application information as previously registered by the user. Server 106 can subsequently determine whether the first verification information in the first data packet matches the previously stored/registered network configuration information and application information in order to determine whether it satisfies the predetermined condition. If the condition is satisfied, server 106 can send a first command 126/128 to device 108. Upon receiving first command 128, device 108 can execute the instructions indicated in first command 128.

If the condition is not satisfied, server 106 can perform a supplemental check by generating and sending a verification code 130/132 to a phone number associated with user 104. In FIG. 1A, assume that computing device 102 corresponds to a device which has a phone number associated with user 104. Upon receiving verification code 132, user 104, via computing device 102, can send a code authentication 134/136 back to server 106. Upon receiving code authentication 136, server 106 can determine whether code authentication 136 is the proper response to verification code 130. If it is, server 106 can proceed to send first command 126/128 to device 108, and if it is not, server 106 can refrain from sending first command 126/128 to device 108.

Figure 1B:
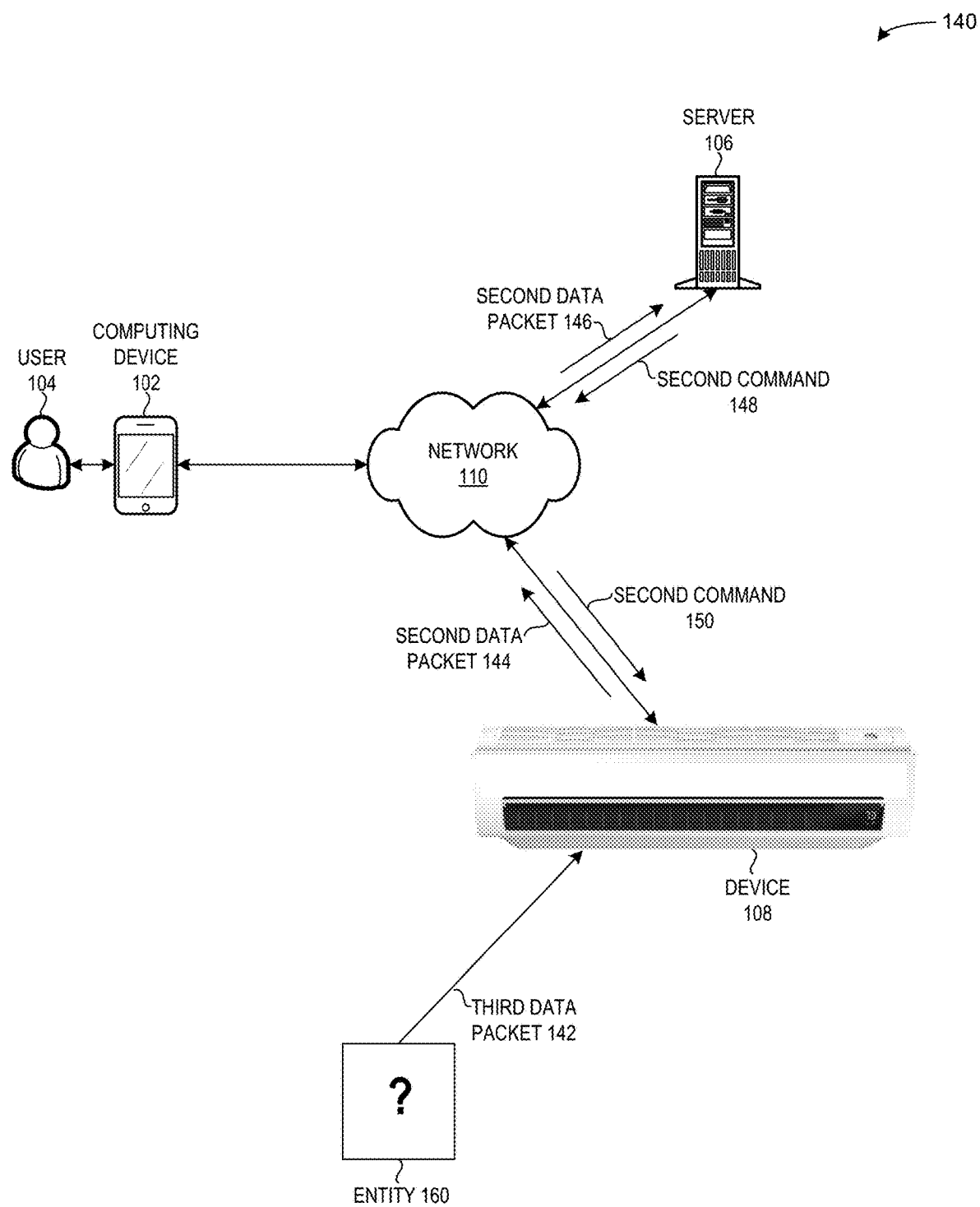
FIG. 1B illustrates an exemplary environment and communication that facilitate network security, in accordance with an embodiment of the present application.

FIG. 1B illustrates an exemplary environment 140 and communication that facilitates network security, in accordance with an embodiment of the present application. During operation, device 108 can receive a third data packet 142 from an entity 160. Entity 160 can be any entity, including an unknown entity or an "authorized" computing device of a user on an application (e.g., user 104 associated with computing device 120), and device 108 can request verification of third data packet 142 received from entity 160. For example, device 108 can extract certain information from third data packet 142, such as an IP address of the sender and a corresponding network type. Device 108 can create a second data packet 144, insert the information extracted from third data packet 142 ("second verification information") into second data packet 144, and send second data packet 144/146 to server 106 for verification. Upon receiving second data packet 146, server 106 can determine whether the second verification information included in second data packet 146 satisfies a predetermined condition. Similar to the first verification information, the second verification information can include network configuration information and application information.

Server 106 can subsequently determine whether the second verification information in the second data packet matches the previously stored/registered network configuration information and application information in order to determine whether it satisfies the predetermined condition. If the condition is satisfied, server 106 can send a second command 148/150 to device 108, instructing device 108 to proceed with executing a command associated with third data packet 142. Upon receiving second command 150, device 108 can execute the instructions indicated in third data packet 142 (e.g., by processing third data packet 142). If the condition is not satisfied, server 106 can send second command 148/150 to device 108, instructing device 108 to refrain from executing the command associated with third data packet 142. Upon receiving second command 150, device 108 can refrain from executing the instructions indicated in third data packet 142 (e.g., by discarding third data packet 142).

Exemplary User Interface

Figure 2B:
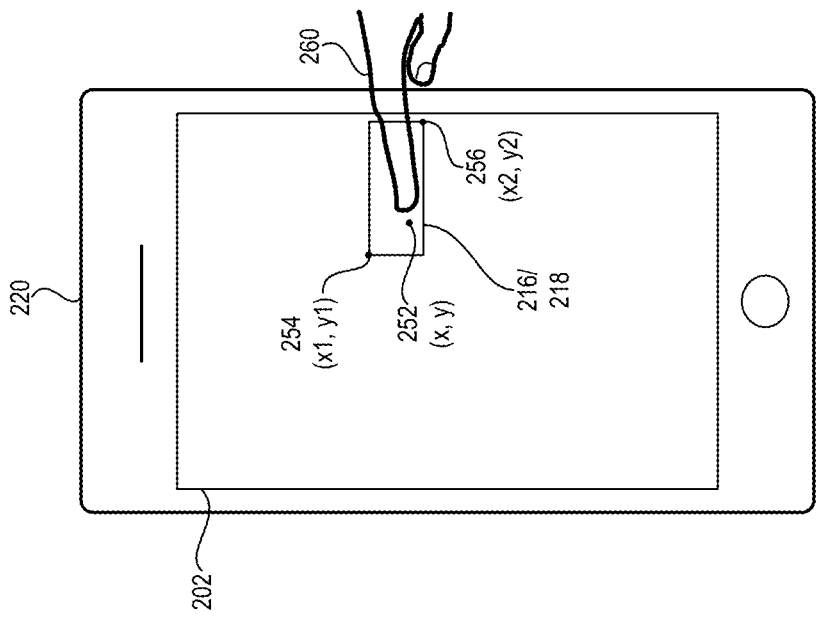
FIG. 2B illustrates an exemplary user interface in a computing device for facilitating network security, in accordance with an embodiment of the present application.
Figure 2A:
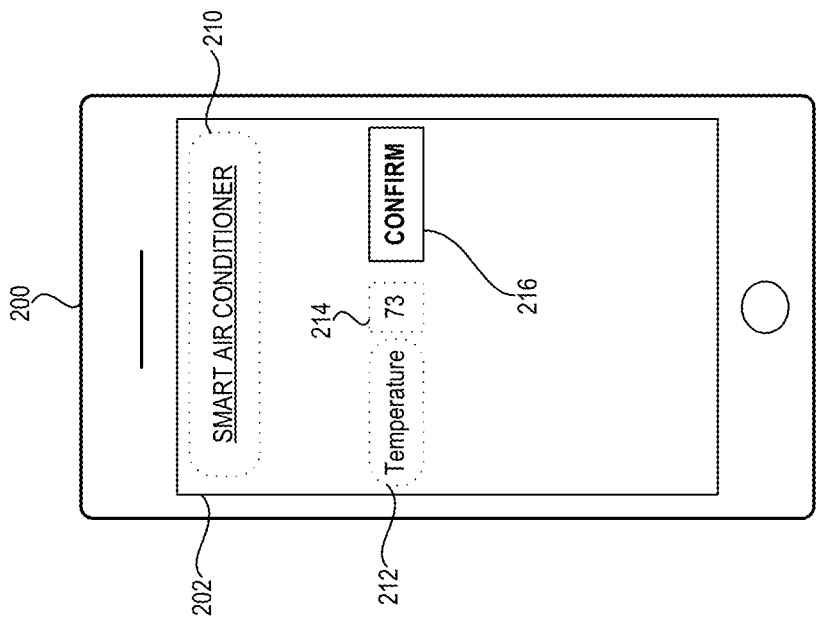
FIG. 2A illustrates an exemplary user interface in a computing device for facilitating network security, in accordance with an embodiment of the present application.

FIG. 2A illustrates an exemplary user interface in a computing device 200 for facilitating network security, in accordance with an embodiment of the present application. Device 200 can include a display 202 which displays controls and information related to an application running on device 200. Display 202 can include: a field 210 which indicates an end device to be controlled (e.g., "SMART AIR CONDITIONER"); a field 212 which indicates a setting or a feature for the end device to be controlled (e.g., "Temperature"); a field 214 which indicates a value for the setting or the feature for the end device to be controlled (e.g., "73" degrees Fahrenheit); and a control button 216 which a user can select/touch to send a command corresponding to the values of fields 210, 212, and 214. Fields 210, 212, and 214 and button 216 can be controls such as a dropdown box, a radio button, an input box, or other widget. During operation, a user can register network confirmation information and application information associated with the user, device 200, and an application running on device 200.

FIG. 2B illustrates an exemplary user interface in a computing device 200 for facilitating network security, in accordance with an embodiment of the present application. Device 220 of FIG. 2B is similar to device 200 of FIG. 2A, and illustrates a rectangular region 218 corresponding to control button 216 of FIG. 2A. Region 218 can be identified as a quadrant of a graph defined by a point 254 (with a position coordinate value of "x1, y1") and a point 256 (with a position coordinate value of "x2, y2"). Points 254 and 256 which define the rectangular region 218 corresponding to control button 216 can be registered by the user prior to using the application to send a control command to the end device, e.g., as part of an initialization process. Using a finger 260, the user can touch control button 216 in a spot of region 218, which is marked by a point 252 (with a position coordinate value of "x, y"). The position coordinate value of point 252 can be included in the verification information sent to the server, as described above in relation to FIG. 1A, and as discussed further below in relation to FIG. 3B. For example, the server can determine that the position coordinates for point 252 do fall within region 218 defined by points 254 and 256. Note that while control 216 and corresponding region 218 are depicted in FIGS. 2A and 2B as a rectangle shape, a control selected or touched by the user can take any shape, and can be defined by one or more points.

Figure 3A:
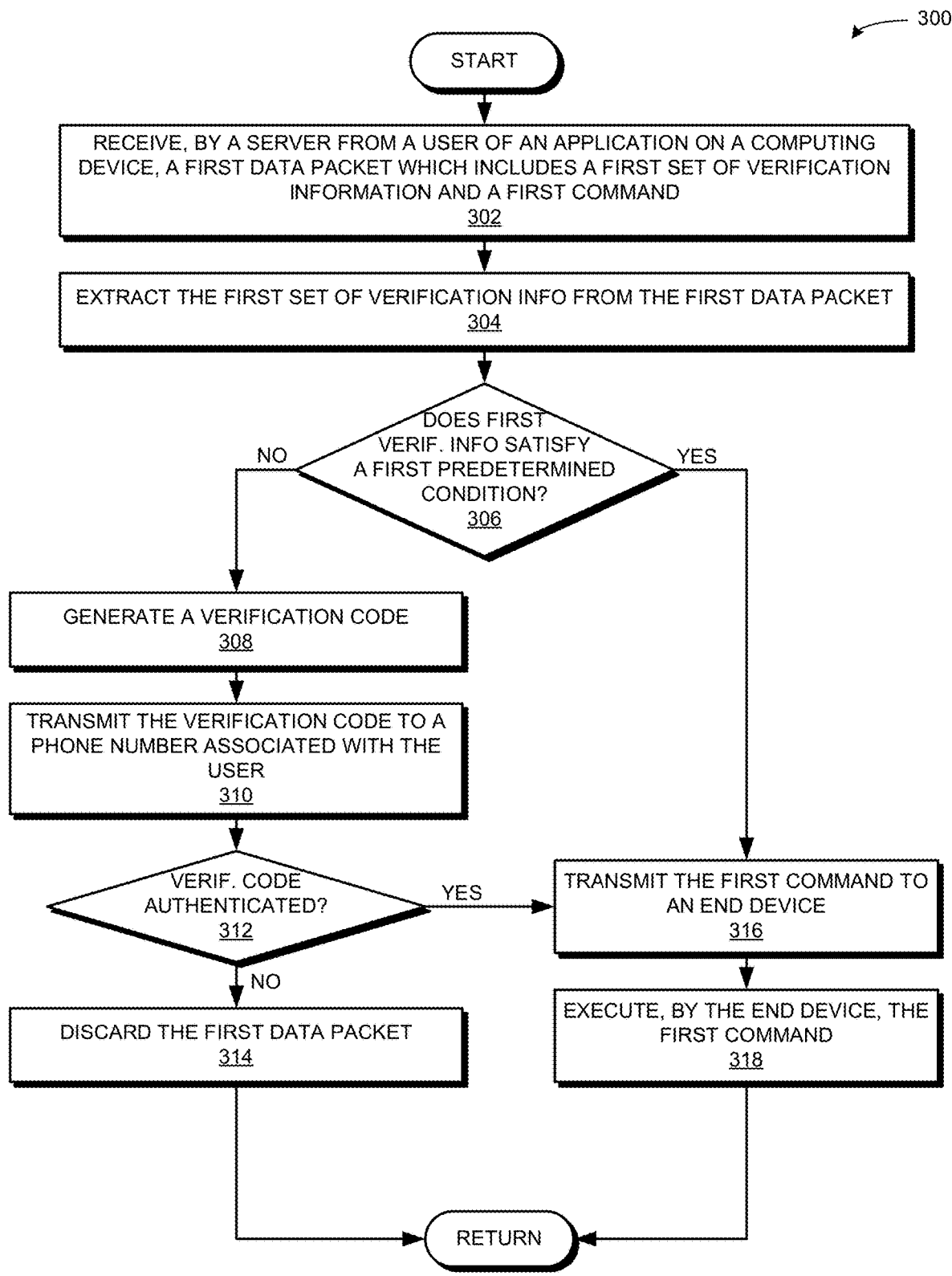
FIG. 3A presents a flowchart illustrating a method for facilitating network security, including verification of a first data packet received from a computing device by a server, in accordance with an embodiment of the present application.

Method for Facilitating Network Security: Verification of a Packet Received from a Computing Device by a Server FIG. 3A presents a flowchart 300 illustrating a method for facilitating network security, including verification of a first data packet received from a computing device by a server, in accordance with an embodiment of the present application. During operation, the system receives, by a server from a user of an application on a computing device, a first data packet which includes a first set of verification information and a first command (operation 302). The system extracts the first set of verification information from the first data packet (operation 304). If the first set of verification information satisfies a first predetermined condition (decision 306), the server transmits the first command to an end device (operation 316), and the end device executes the first command (operation 318). If the first set of verification information does not satisfy a first predetermined condition (decision 306), the server generates a verification code (operation 308) and transmits the verification code to a phone number associated with the user (operation 310). In some embodiments, the server can transmit the verification code as an email to an email address, as a text message to a mobile telephone, or another digital manner by which to reach the user, e.g., to a network-accessible account of the user. The user can configure this information during an initialization or registration process.

The user can respond to the verification code, e.g., by sending a confirmation of having receiving the verification code, or by entering the verification code in a screen or dialogue box presented to the user (e.g., on the same device from which the user sent the command, or via the digital manner by which the verification was sent to the user). If the verification is successfully authenticated by the server (decision 312), the server transmits the first command to an end device (operation 316), and the end device executes the first command (operation 318). If the verification is not successfully authenticated by the server (decision 312), the server discards the first packet (operation 314), which results in the first data packet not being sent to the end device. That is, the server refrains from sending the first data packet to the end device.

Figure 3B:
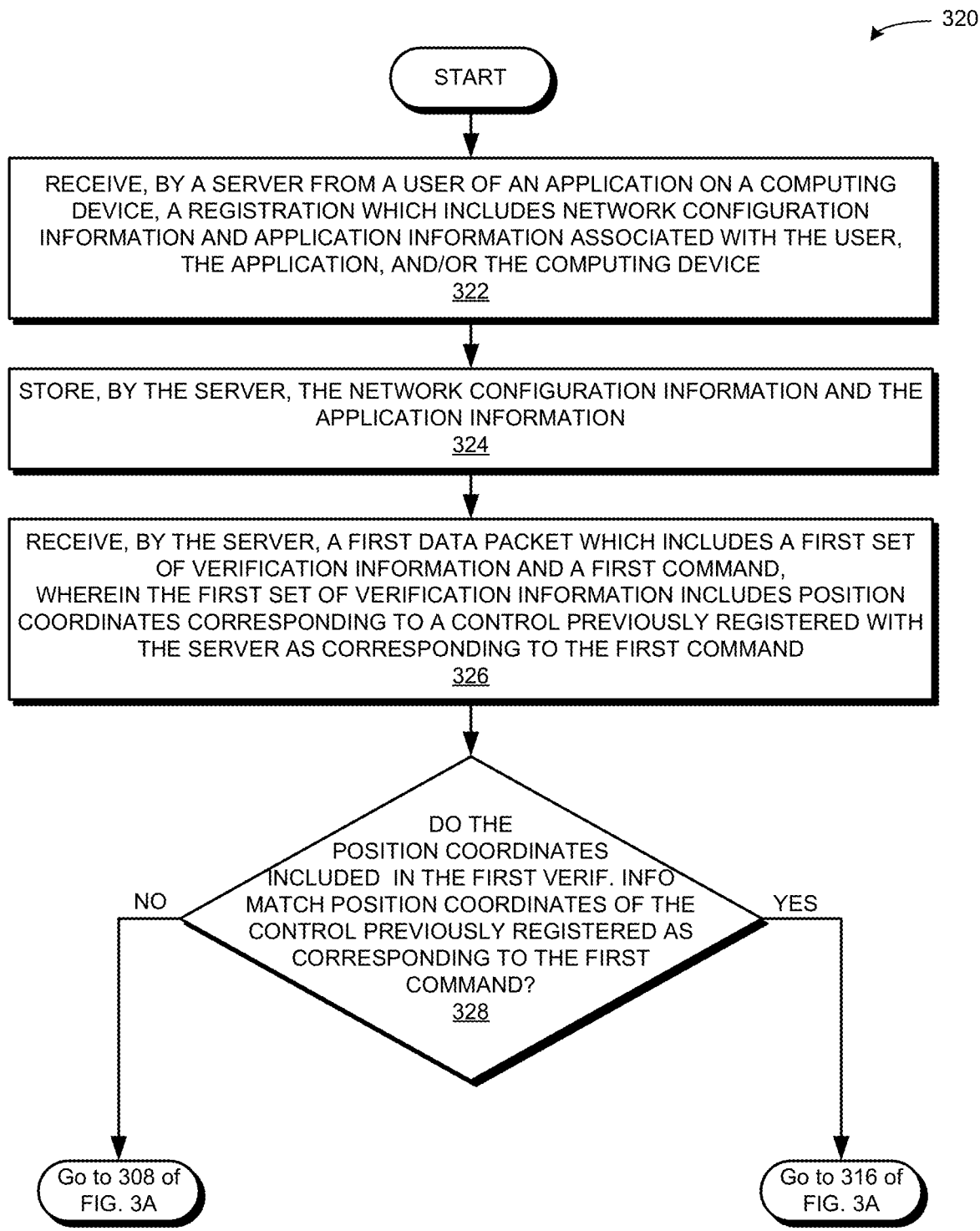
FIG. 3B presents a flowchart illustrating a method for facilitating network security, including verification of position coordinates, in accordance with an embodiment of the present application.

FIG. 3B presents a flowchart 320 illustrating a method for facilitating network security, including verification of position coordinates, in accordance with an embodiment of the present application. During operation, the system receives, by a server from a user of an application on a computing device, a registration which includes network configuration information and application information associated with the user, the application, and/or the computing device (operation 322). The system stores, by the server, the network configuration information and the application information (operation 324). The system receives, by the server, a first data packet which includes a first set of verification information and a first command, wherein the first set of verification information includes position coordinates corresponding to a control previously registered with the server as corresponding to the first command (operation 326). If the position coordinates included in the first set of verification information match position coordinates of the control previously registered as corresponding to the first command (decision 328) (e.g., as determined by the server), the operation continues at operation 316 of FIG. 3A. If the position coordinates included in the first set of verification information do not match position coordinates of the control previously registered as corresponding to the first command (decision 328) (e.g., as determined by the server), the operation continues at operation 308 of FIG. 3A.

Figure 4A:
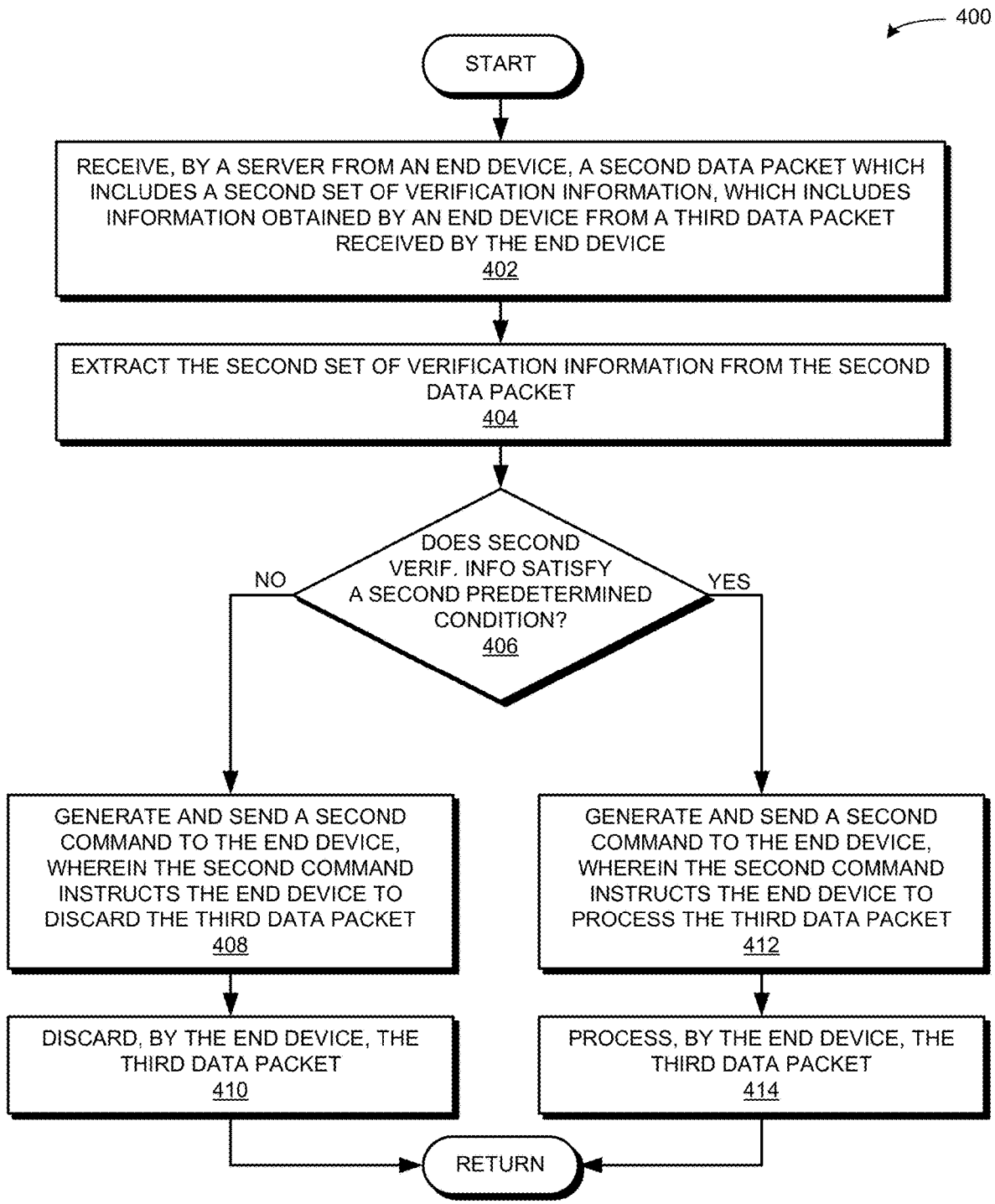
FIG. 4A presents a flowchart illustrating a method for facilitating network security, including verification of a second data packet received from an end device by a server, in accordance with an embodiment of the present application.

Method for Facilitating Network Security: Verification of a Packet Received from a Computing Device by a Server FIG. 4A presents a flowchart 400 illustrating a method for facilitating network security, including verification of a second data packet received from an end device by a server, in accordance with an embodiment of the present application. During operation, the system receives, by a server from an end device, a second data packet which includes a second set of verification information, which includes information obtained by an end device from a third packet received by the end device (operation 402). The system extracts the second set of verification information from the second data packet (operation 404). If the second set of verification information satisfies a second predetermined condition (decision 406), the system generates and sends a second command to the end device, wherein the second command instructs the end device to process the third data packet (operation 412). The end device processes the third data packet (operation 414). Processing the third data packet may include executing an instruction associated with or included in the third data packet, such as turning on a smart device, or setting a certain value for a feature of a smart device (as depicted above in relation to FIGS. 2A and 2B).

If the second set of verification information does not satisfy a second predetermined condition (decision 406), the system generates and sends a second command to the end device, wherein the second command instructs the end device to discard the third data packet (operation 408). The end device discards the third data packet (operation 410). Discarding the data packet can include refraining from executing an instruction associated with or included in the third data packet.

Figure 4B:
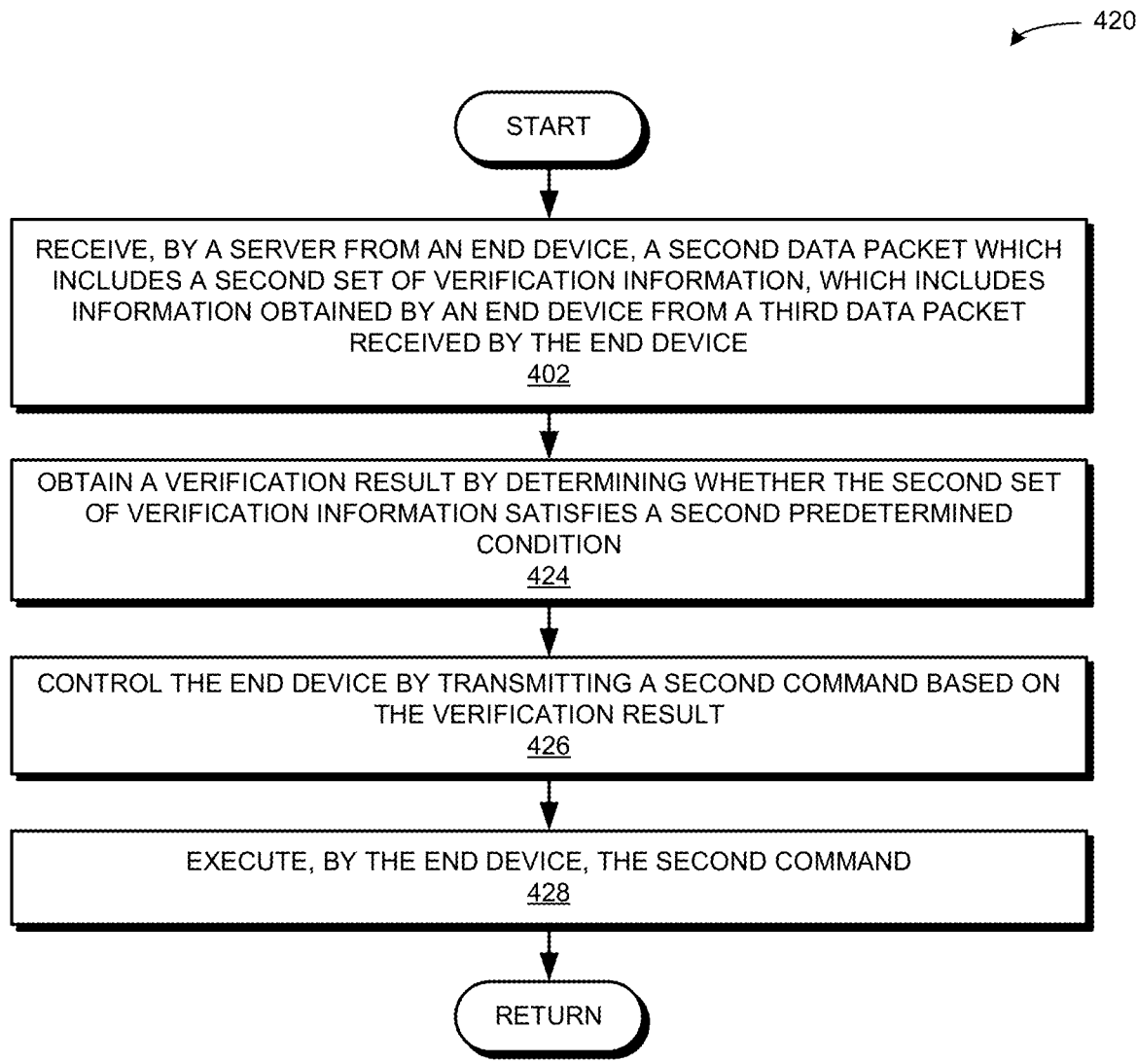
FIG. 4B presents a flowchart illustrating a method for facilitating network security, including verification of a second data packet received from an end device by a server, in accordance with an embodiment of the present application.

FIG. 4B presents a flowchart 420 illustrating a method for facilitating network security, including verification of a second data packet received from an end device by a server, in accordance with an embodiment of the present application. During operation, the system receives, by a server from an end device, a second data packet which includes a second set of verification information, which includes information obtained by an end device from a third data packet received by the end device (operation 402). The system obtains a verification result by determining whether the second set of verification information satisfies a second predetermined condition (operation 424). The system controls the end device by transmitting a second command based on the verification result (operation 426). Subsequently, the end device executes the second command (operation 428).

Figure 4C:
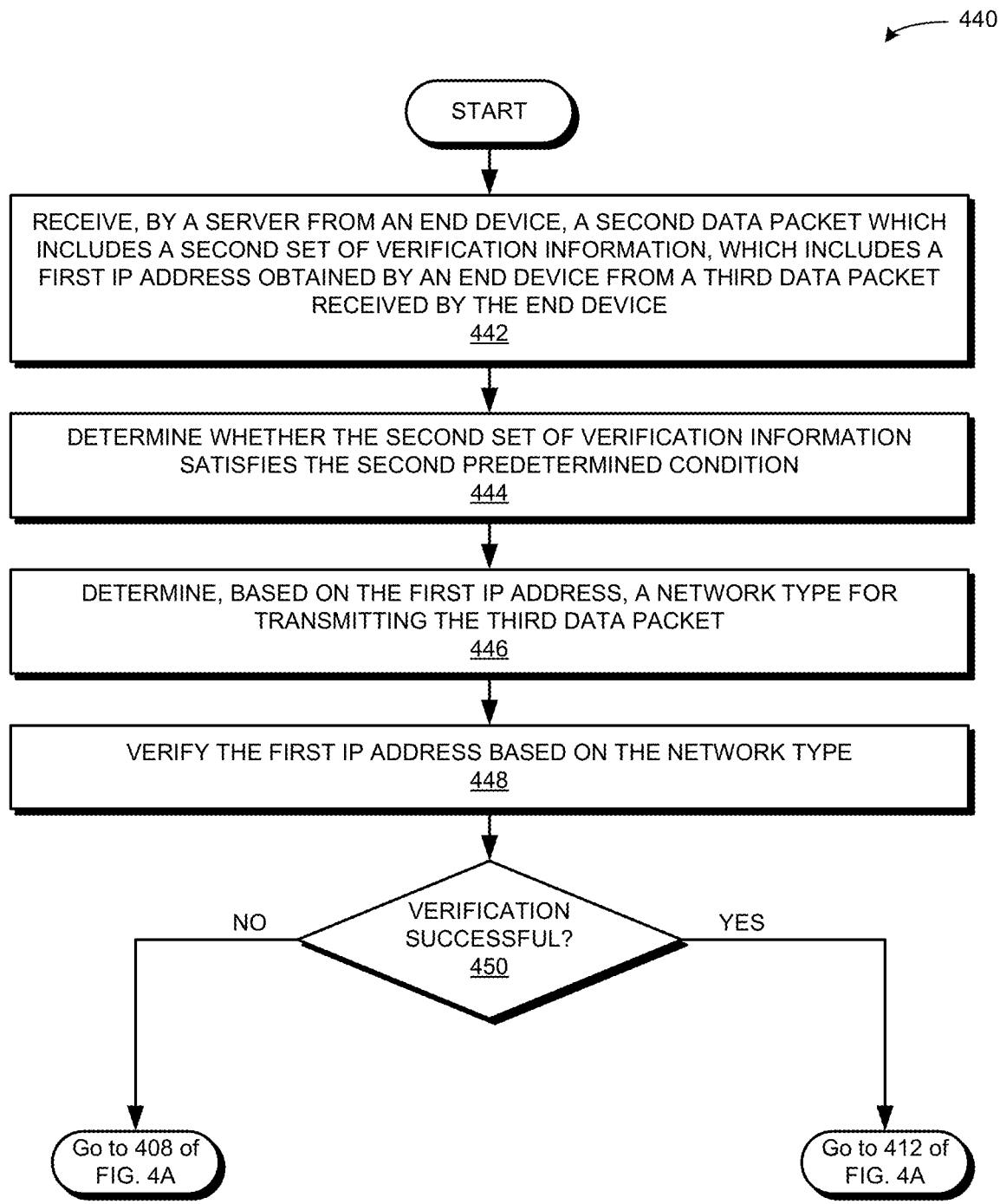
FIG. 4C presents a flowchart illustrating a method for facilitating network security, including verification of an IP address carried in a second data packet and obtained from a third data packet received by an end device, in accordance with an embodiment of the present application.

FIG. 4C presents a flowchart 440 illustrating a method for facilitating network security, including verification of an IP address carried in a second data packet and obtained from a third data packet received by an end device, in accordance with an embodiment of the present application. During operation, the system receives, by a server from an end device, a second data packet which includes a second set of verification information, which includes a first IP address obtained by an end device from a third data packet received by the end device (operation 442). The system determines whether the second set of verification information satisfies the second predetermined condition (operation 444). The system determines, based on the first IP address, a network type for transmitting the third data packet (operation 446). The system verifies the first IP address based on the network type (operation 448). If the verification is successful (decision 450), the operation continues at operation 412 of FIG. 4A. If the verification is not successful (decision 450), the operation continues at operation 408 of FIG. 4A.

Exemplary Computer System and Apparatus

Figure 5:
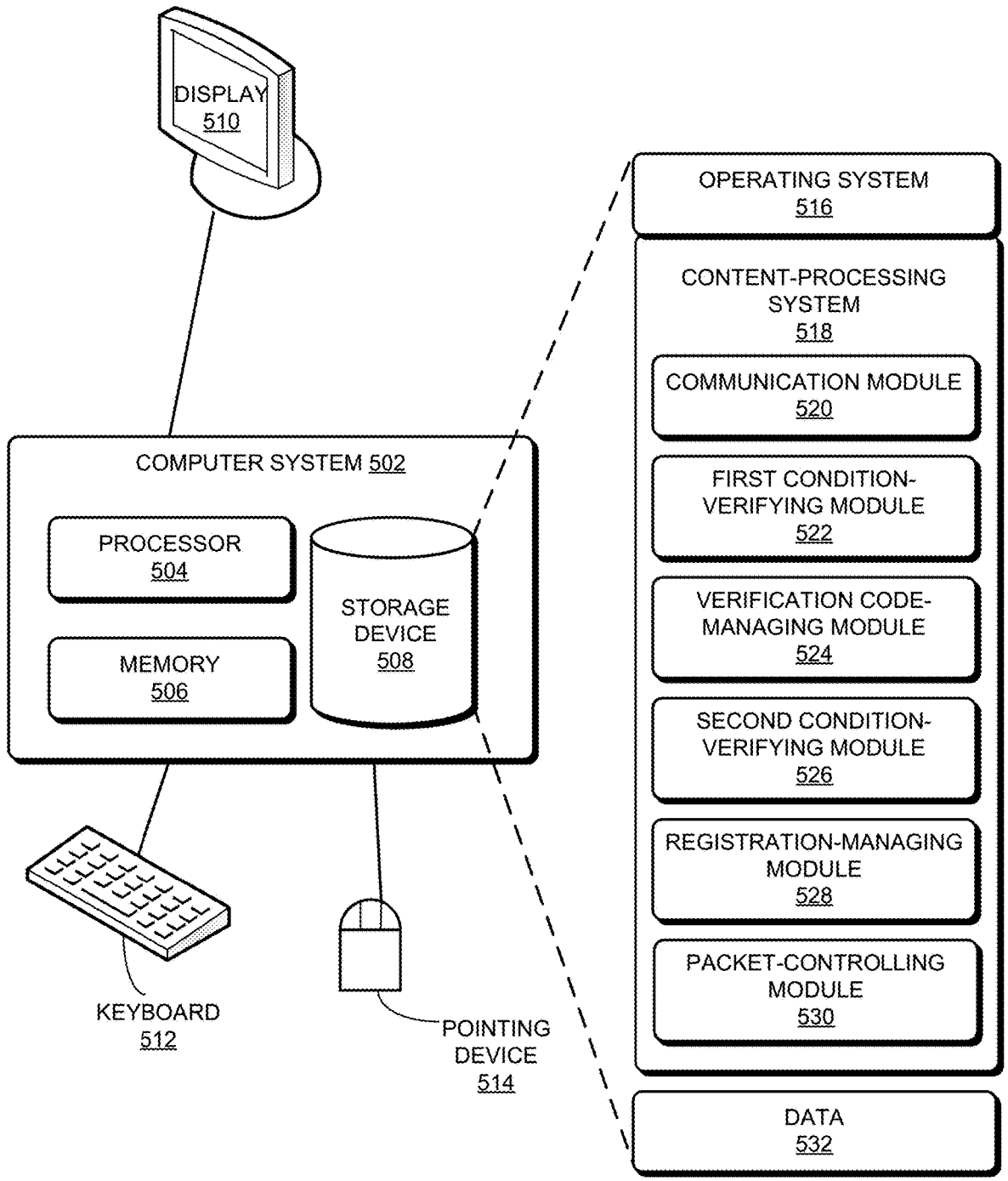
FIG. 5 illustrates an exemplary computer system that facilitates network security, in accordance with an embodiment of the present application.

FIG. 5 illustrates an exemplary computer system 502 that facilitates network security, in accordance with an embodiment of the present application. Computer system 502 includes a processor 504, a memory 506, and a storage device 508. Memory 506 can include a volatile memory (e.g., RAM) that serves as a managed memory, and can be used to store one or more memory pools. Furthermore, computer system 502 can be coupled to a display device 510, a keyboard 512, and a pointing device 514. Storage device 508 can store an operating system 516, a content-processing system 518, and data 532. Computer system 502 can be a server, such as server 106 in FIGS. 1A and 1B.

Content-processing system 518 can include instructions, which when executed by computer system 502, can cause computer system 502 to perform methods and/or processes described in this disclosure. Specifically, content-processing system 518 may include instructions for sending and/or receiving data packets to/from other network nodes across a computer network, e.g., to/from a computing device, a server, and an end device.

Content-processing system 518 can further include instructions for receiving, by a server from a user of an application on a computing device, a first data packet which includes a first set of verification information and a first command (communication module 520). Content-processing system 518 can include instructions for, in response to determining that the first set of verification information does not satisfy a first predetermined condition (first condition-verifying module 522), performing the following operations: generating a verification code destined for a first computing device associated with the user (verification code-managing module 524); in response to not successfully authenticating the verification code (verification code-managing module 524), discarding the first data packet (packet-controlling module 530). Content-processing system 518 can include instructions for, in response to successfully authenticating the verification code, transmitting the first command to an end device (communication module 520), which causes the end device to execute the first command (packet-controlling module 530).

Content-processing system 518 can include instructions for receiving, by the server from a second computing device, a registration which includes network configuration information and application information (registration-managing module 528). Content-processing system 518 can include instructions for storing, by the server, the registered network configuration information and the registered application information (registration-managing module 528).

Content-processing system 518 can include instructions for receiving, by the server from the end device, a second data packet which includes a second set of verification information (communication module 520). Content-processing system 518 can include instructions for obtaining a verification result by determining whether the second set of verification information satisfies a second predetermined condition (second condition-verifying module 526). Content-processing system 518 can include instructions for controlling the end device by transmitting a second command based on the verification result (packet-controlling module 530 and communication module 520), which causes the end device to execute the second command (packet-controlling module 530).

Data 532 can include any data that is required as input or that is generated as output by the methods and/or processes described in this disclosure. Specifically, data 532 can store at least: a data packet; a set of verification information; a verification code; a phone number; a command; a verification result; network configuration information; application information; an IP address; an IP address of a network; a wireless local area network name; an SSID; information to identify a network; a system time of an access to a network; information related to an operating system on which the application runs; a version of the application; sizes of controls in an interface for the application; and position coordinates for the controls in the interface for the application.

Figure 6:
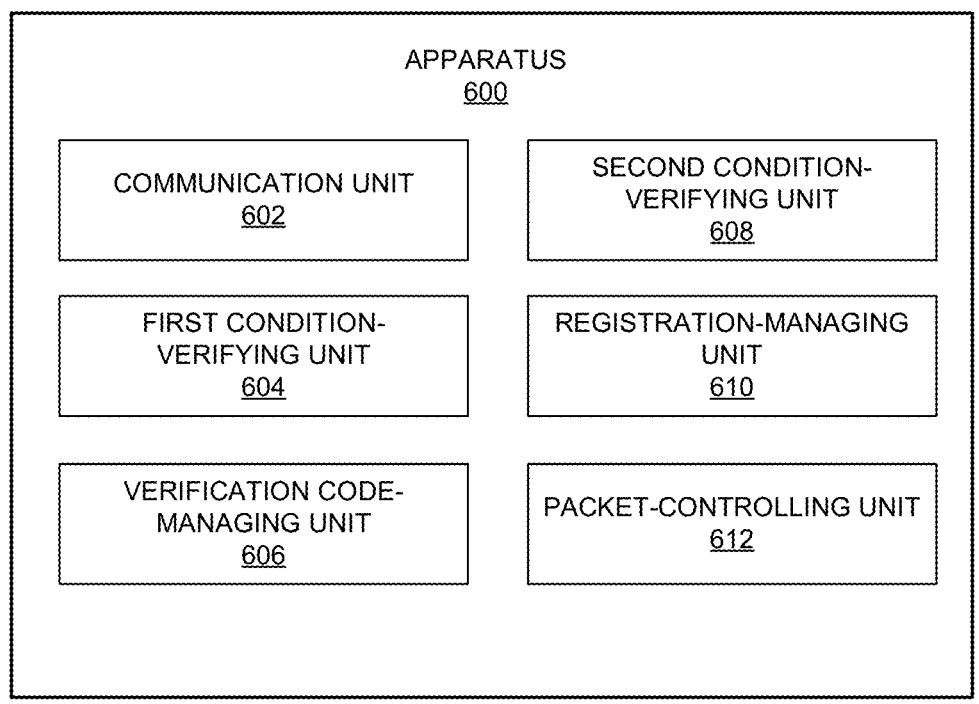
FIG. 6 illustrates an exemplary apparatus that facilitates network security, in accordance with an embodiment of the present application.

FIG. 6 illustrates an exemplary apparatus 600 that facilitates network security, in accordance with an embodiment of the present application. Apparatus 600 can comprise a plurality of units or apparatuses which may communicate with one another via a wired, wireless, quantum light, or electrical communication channel. Apparatus 600 may be realized using one or more integrated circuits, and may include fewer or more units or apparatuses than those shown in FIG. 6. Further, apparatus 600 may be integrated in a computer system, or realized as a separate device which is capable of communicating with other computer systems and/or devices. Specifically, apparatus 600 can comprise units 602-612 which perform functions or operations similar to modules 520-530 of computer system 502 of FIG. 5, including: a communication unit 602; a first condition-verifying unit 604; a verification code-managing unit 606; a second condition-verifying unit 608; a registration-managing unit 610; and a packet-controlling unit 612.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Another embodiment provides a first network protection system comprising: a server, a controlling end device, and a controlled end device. The server is configured to receive a first data packet from the controlling end device, parse first verification information and a first control instruction out of the first data packet, and send the first control instruction to the controlled end device if the first verification information satisfies a preset condition, wherein the first control instruction is used for controlling a working state of the controlled end device. The controlled end device is configured to perform an action corresponding to the first control instruction.

In some embodiments of the first network protection system, the controlling end device is further configured to send position coordinates corresponding to the first control instruction to the server. The server is further configured to determine whether the coordinate position is in a region of a touch button corresponding to the first control instruction, and determine that the first verification information satisfies the preset condition if the position coordinates are in the region; and determine that the first verification information does not satisfy the preset condition if the coordinate position is not in the region.

Another embodiment provides a second network protection system, comprising: a server and a controlled end device. The server is configured to: receive a second data packet from the controlled end device, wherein the second data packet comprises second verification information; generate a second control instruction based on a verification result on the second verification information, wherein the second control instruction is used for controlling the controlled end device to respond or not respond to a third data packet received from a network; and send the second control instruction to the controlled end device. The controlled end device is configured to perform an action corresponding to the second control instruction.

In some embodiments of the second network protection system, the second verification information comprises an IP address carried in the second data packet, and the IP address is a source IP address parsed out of the third data packet by the controlled end device. The server is further configured to determine, based on the IP address, a network type for transmitting the third data packet, verify the IP address based on the network type to obtain a verification result, and generate the second control instruction based on the verification result.

Another embodiment provides a first network protection method, comprising: receiving a first data packet from a controlling end device, wherein the first data packet comprises first verification information and a first control instruction; determining whether the first verification information satisfies a preset condition; and sending the first control instruction to a controlled end device In some embodiments, the first network protection method further comprises: generating a verification code if the first verification information does not satisfy the preset condition; stopping sending the first control instruction to the controlled end device if the first verification information is determined as illegal information based on the verification code; and performing the step of sending the first control instruction to a controlled end device if the first verification information is determined as legal information based on the verification code In some embodiments of the first network protection method, the first verification information further comprises a coordinate position, and the coordinate position is a trigger position triggered by a user on an operation interface of the controlling end device to generate the first control instruction. The network protection method further comprises: determining that the first verification information satisfies the preset condition if the coordinate position is in a preset region; and determining that the first verification information does not satisfy the preset condition if the coordinate position is not in the preset region.

In some embodiments of the first network protection method, the first verification information is user identity information registered by a user on an application of the controlling end device, and the application provides the user with an operation interface for remotely controlling the controlled end device.

In some embodiments of the first network protection method, the preset region is a region of a touch button corresponding to the first control instruction.

In some embodiments, the first network protection method further comprises: receiving network access configuration information of the controlling end device at first access, version information of an application installed in the controlling end device, and position information of touch buttons in a user interface of the application on the user interface; and storing the network access configuration information, the version information of the application, and the position information of the touch buttons in the user interface of the application on the user interface.

Another embodiment provides a second network protection method, comprising: receiving a second data packet from a controlled end device, wherein the second data packet comprises second verification information; generating a second control instruction based on a verification result on the second verification information, wherein the second control instruction is used for controlling the controlled end device to respond or not respond to a third data packet received from a network; and sending the second control instruction to the controlled end device.

In some embodiments of the second network protection method, the second verification information comprises an IP address carried in the second data packet, and the IP address is a source IP address parsed out of the third data packet by the controlled end device. Generating the second control instruction based on the verification result on the second verification information comprises: determining, based on the IP address, a network type for transmitting the third data packet; verifying the IP address based on the network type to obtain a verification result; and generating the second control instruction based on the verification result.

In some embodiments of the second network protection method: the second control instruction is an instruction instructing the controlled end device to process the third data packet if the result indicates that the second verification information is legal information; and the second control instruction is an instruction instructing the controlled end device to discard the third data packet if the result indicates that the second verification information is illegal information.

Another embodiment provides a first network-protection apparatus, comprising: a first receiving unit configured to receive, from the controlling end device, a first data packet, wherein the first data packet comprises first verification information and a first control instruction; a verification unit configured to determining whether the verification information satisfies a preset condition; and a first transmitting unit configured to transmit the first control instruction to a controlled end device responsive to the verification unit verifying that the verification information satisfies the present condition.

Another embodiment provides a second network-protection apparatus, comprising: a second receiving unit configured to receive, from a controlled end device, a second data packet, wherein the second data packet comprises second verification information; a control-instruction-generation unit configured to generate a second control instruction based on a verification result on the second verification information, wherein the second control instruction is used for controlling the controlled end device to respond or not respond to a third data packet received from a network; and a second transmitting unit configured to transmit the second control instruction to the controlled end device.

Another embodiment provides a computer-readable storage medium for storing instructions, which when executed by a computer cause the computer to perform the first network-protection method or the second network protection, as described above.

Another embodiment provides a computer server, comprising: a processor; and a memory for storing instructions to be executed by the processor, wherein the processor can be configured to: receive, from the controlling end device, a first data packet, wherein the first data packet comprises first verification information and a first control instruction; determine that the verification information satisfies a preset condition; and transmit the first control instruction to a controlled end device.

Another embodiment provides a control method, comprising: detecting first verification information triggered by a user on an operation interface to generate a first control instruction; writing the first control instruction and the first verification information into a first data packet; and sending the first data packet to a server.

In some embodiments of the control method, the first verification information comprises a coordinate position, and the coordinate position is a trigger position triggered by the user on the operation interface of the controlling end device to generate the first control instruction.

Another embodiment provides a remote control apparatus or a smart appliance, comprising: a first signal processor and a first signal transceiver, wherein the first signal processor is configured to: detect first verification information triggered by a user on an operation interface to generate a first control instruction; and write the first control instruction and the first verification information into a first data packet; and wherein the first signal transceiver is configured to transmit the first data packet to a server.

Another embodiment provides a smart appliance, comprising: a second signal transceiver and a second signal processor. The second signal transceiver is configured to receive a first data packet from a controlling end device, wherein the first data packet comprises first verification information and a first control instruction. The second signal processor is configured to: determine whether the first verification information received by the first signal transceiver satisfies a preset condition; and execute the first control instruction.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating network security, the method comprising:
   receiving, by a server from an application associated with a user, a first data packet which includes a first set of verification information and a first command to be executed on an end device,
   wherein the first set of verification information includes;
      network configuration information which includes a system time of a first access to the network by the second computing device; and
      application information which includes sizes of controls in an interface for the application; and
   in response to determining, by the server, that the first set of verification information does not satisfy a first predetermined condition:
      generating, by the server, a verification code destined for a first computing device associated with the user;
      in response to not successfully authenticating the verification code, discarding, by the server, the first data packet; and
      in response to successfully authenticating the verification code, transmitting, by the server, the first command to the end device, which causes the end device to execute the first command.

2. The method of claim 1,
   wherein the network configuration information further includes one or more of:
      an IP address of a network accessed by a second computing device on which the application is running; and
      a wireless local area network name of the network accessed by the second computing device;
      and
   wherein the application information further includes one or more of:
      information related to an operating system on which the application runs;
      a version of the application;
      position coordinates for the controls in the interface for the application.

3. The method of claim 2, further comprising:
   receiving, by the server from the second computing device, registration information which includes the network configuration information and the application information; and
   storing, by the server, the registration information.

4. The method of claim 2, wherein determining that the first set of verification information satisfies the first predetermined condition comprises:
- determining that the network configuration information included in the first set of verification information matches network configuration information previously registered with the server; and
- determining that the application information included in the first set of verification information matches application information previously registered with the server.

5. The method of claim 4, wherein determining that the application information included in the first set of verification information matches the application information previously registered with the server comprises:
- determining whether the position coordinates included in the first set of verification information fall within a region of a touch button or control previously registered with the server as corresponding to the first command.

6. The method of claim 1, further comprising:
- in response to determining that the first set of verification information satisfies the first predetermined condition, transmitting the first command to the end device.

7. The method of claim 1,
wherein the first computing device is one or more of:
- a mobile telephone; and
- a personal computing device, and wherein the verification code is destined for one or more of:
- a phone number corresponding to the mobile telephone; and
- an email account or a network-accessible account of the user.

8. The method of claim 1, further comprising:
- receiving, by the server from the end device, a second data packet which includes a second set of verification information, which includes information obtained by the end device from a third data packet received by the end device;
- obtaining a verification result by determining whether the second set of verification information satisfies a second predetermined condition; and
- controlling the end device by transmitting a second command based on the verification result, which causes the end device to execute the second command.

9. The method of claim 8, wherein in response to determining that the second set of verification information does not satisfy the second predetermined condition, the transmitted second command instructs the end device to discard the third data packet, and
wherein in response to determining that the second set of verification information satisfies the second predetermined condition, the transmitted second command instructs the end device to process the third data packet.

10. The method of claim 8, wherein the second set of verification information includes a first IP address obtained by the end device from the third data packet, and
wherein determining that the second set of verification information satisfies the second predetermined condition comprises:
- determining, based on the first IP address, a network type for transmitting the third data packet; and
- verifying the first IP address based on the network type.

11. A computer system for facilitating network security, the system comprising:
- a processor; and
- a memory coupled to the processor and storing instructions, which when executed by the processor cause the processor to perform a method, the method comprising:
  - receiving, by the computer system from an application associated with a user, a first data packet which includes a first set of verification information and a first command to be executed on an end device,
  wherein the first set of verification information includes;
    - network configuration information which includes a system time of a first access to the network by the second computing device; and
    - application information which includes sizes of controls in an interface for the application; and
  - in response to determining, by the server, that the first set of verification information does not satisfy a first predetermined condition:
    - generating, by the server, a verification code destined for a first computing device associated with the user;
    - in response to not successfully authenticating the verification code, discarding, by the server, the first data packet; and
    - in response to successfully authenticating the verification code, transmitting, by the server, the first command to the end device, which causes the end device to execute the first command.

12. The computer system of claim 11,
wherein the network configuration information further includes one or more of:
- an IP address of a network accessed by a second computing device on which the application is running; and
- a wireless local area network name of the network accessed by the second computing device; and wherein the application information further includes one or more of:
- information related to an operating system on which the application runs;
- a version of the application; and
- position coordinates for the controls in the interface for the application.

13. The computer system of claim 12, wherein the method further comprises:
- receiving, by the computer system from the second computing device, registration information which includes the network configuration information and the application information; and
- storing, by the computer system, the registration information.

14. The computer system of claim 12, wherein determining that the first set of verification information satisfies the first predetermined condition comprises:
- determining that the network configuration information included in the first set of verification information matches network configuration information previously registered with the computer system; and
- determining that the application information included in the first set of verification information matches application information previously registered with the computer system.

15. The computer system of claim 14, wherein determining that the application information included in the first set of verification information matches the application information previously registered with the computer system comprises:

determining whether the position coordinates included in the first set of verification information fall within a region of a touch button or control previously registered with the computer system as corresponding to the first command.

16. The computer system of claim 11, wherein the method further comprises:
in response to determining that the first set of verification information satisfies the first predetermined condition, transmitting the first command to the end device.

17. The computer system of claim 11,
wherein the first computing device is one or more of:
a mobile telephone; and
a personal computing device, and
wherein the verification code is destined for one or more of:
a phone number corresponding to the mobile telephone; and
an email account or a network-accessible account of the user.

18. The computer system of claim 11, wherein the method further comprises:
receiving, by the computer system from the end device, a second data packet which includes a second set of verification information, which includes information obtained by the end device from a third data packet received by the end device;
obtaining a verification result by determining whether the second set of verification information satisfies a second predetermined condition; and
controlling the end device by transmitting a second command based on the verification result, which causes the end device to execute the second command.

19. The computer system of claim 18, wherein in response to determining that the second set of verification information does not satisfy the second predetermined condition, the transmitted second command instructs the end device to discard the third data packet, and
wherein in response to determining that the second set of verification information satisfies the second predetermined condition, the transmitted second command instructs the end device to process the third data packet.

20. The computer system of claim 18, wherein the second set of verification information includes a first IP address obtained by the end device from the third data packet, and
wherein determining that the second set of verification information satisfies the second predetermined condition comprises:
determining, based on the first IP address, a network type for transmitting the third data packet; and
verifying the first IP address based on the network type.

* * * * *

UNITED STATES PATENT AND TRADEMARK OFFICE
CERTIFICATE OF CORRECTION

PATENT NO.          : 10,951,614 B2
APPLICATION NO.     : 15/886582
DATED               : March 16, 2021
INVENTOR(S)         : Jincheng Liu Page 1 of 1

It is certified that error appears in the above-identified patent and that said Letters Patent is hereby corrected as shown below:

In the Claims

Column 14, Line 59 - should read:
"a version of the application; and"

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*